United States Patent [19]

Takagi et al.

[11] 4,383,170
[45] May 10, 1983

[54] IMAGE INPUT DEVICE

[75] Inventors: Nobuyuki Takagi, Koganei; Hiroshi Kobayashi, Tokyo; Okio Yoshida, Yokohama, all of Japan

[73] Assignee: Tokyo Shibaura Denki Kabushiki Kaisha, Kawasaki, Japan

[21] Appl. No.: 207,474

[22] Filed: Nov. 17, 1980

[30] Foreign Application Priority Data

Nov. 19, 1979 [JP] Japan .................. 54-148842

[51] Int. Cl.³ ............................... H01J 3/14
[52] U.S. Cl. .................... 250/216; 250/578
[58] Field of Search ........... 250/201, 202, 203, 204, 250/216, 234, 235, 236, 578; 350/381, 382, 383, 355, 356, 357; 358/199, 201, 212, 213

[56] References Cited

U.S. PATENT DOCUMENTS

| 3,495,091 | 2/1970 | Schmidt et al. | 350/380 |
| 3,930,119 | 12/1975 | Schmidt et al. | 350/356 |
| 3,970,778 | 7/1976 | Adkins | 250/578 |
| 4,005,285 | 1/1977 | Price | 250/208 |
| 4,009,388 | 2/1977 | Seachman | 250/208 |
| 4,093,866 | 6/1978 | Kasdan et al. | 250/578 |
| 4,097,900 | 6/1978 | Moulin et al. | 358/201 |

FOREIGN PATENT DOCUMENTS 10926 of 0000 European Pat. Off. .

OTHER PUBLICATIONS

"High Resolution Image Line Scanning with an Area Image Sensor" by Robert A. Sprague and William D. Turner, 1978 Proceedings of the International Conference on the Application of Charged Coupled Devices, pp. 1-13 to 1-23, Oct. 25-27, 1978, held in San Diego, Calif., (the Sprague et al. Article").

IBM Technical Disclosure Bulletin, vol. 18, No. 6, Nov. 1975.

Primary Examiner—David C. Nelms
Attorney, Agent, or Firm—Schuyler, Banner, Birch, McKie & Beckett

[57] ABSTRACT

An image input device is disclosed including an image source which generates an image light and a light sensor facing the image source. The image light is divided into a number of components by an image dividing device. The light sensor contains a number of photoelectric converting elements, the number of photoelectric converting elements being smaller than the number of components constituting the image light. The image dividing device is placed between the light sensor and the image source to divide the image light into components in a predetermined timed order. The photoelectric converting elements are thereby irradiated in the predetermined timed order and the electrical signals generated by these photoelectric elements are read out in this same predetermined timed order and stored in a memory.

8 Claims, 26 Drawing Figures

| 0000 | 0001 | 0010 | 0011 |
| --- | --- | --- | --- |
| 0100 | 0101 | 0110 | 0111 |
| 1000 | 1001 | 1010 | 1011 |
| 1100 | 1101 | 1110 | 1111 |

IMAGE INPUT DEVICE

BACKGROUND OF THE INVENTION

This invention relates to an image input device for obtaining high resolution image signals from an image source.

Figure 1A:
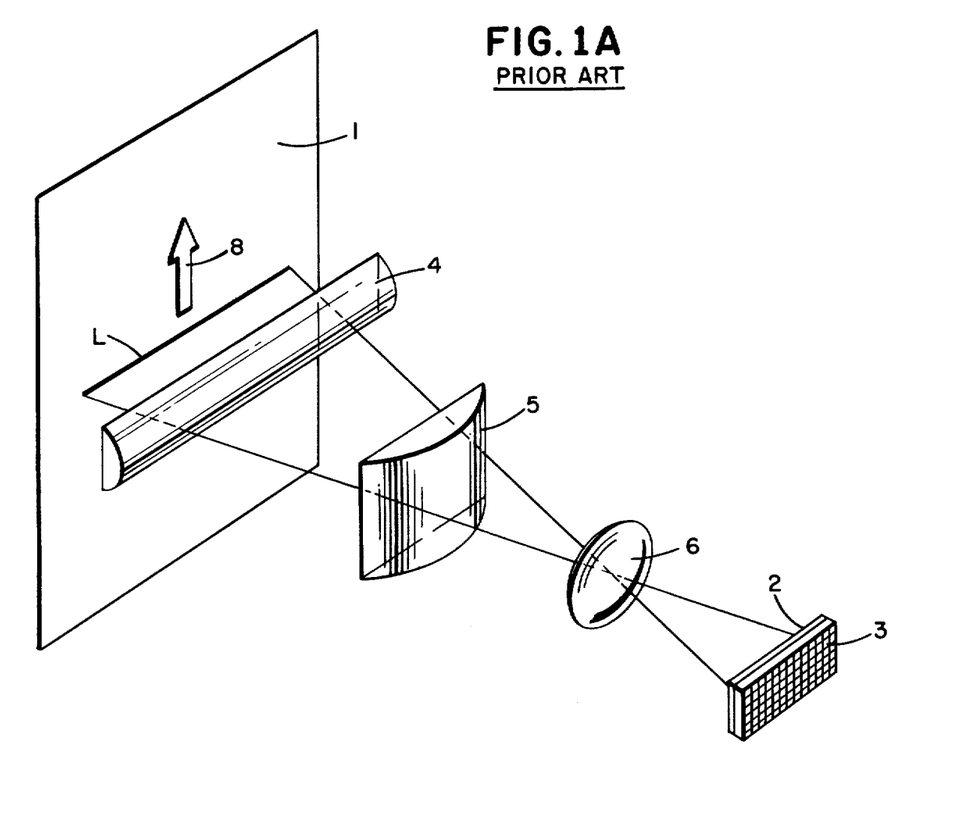
FIG. 1A shows a perspective view of an image input device of the prior art.
Figure 1B:
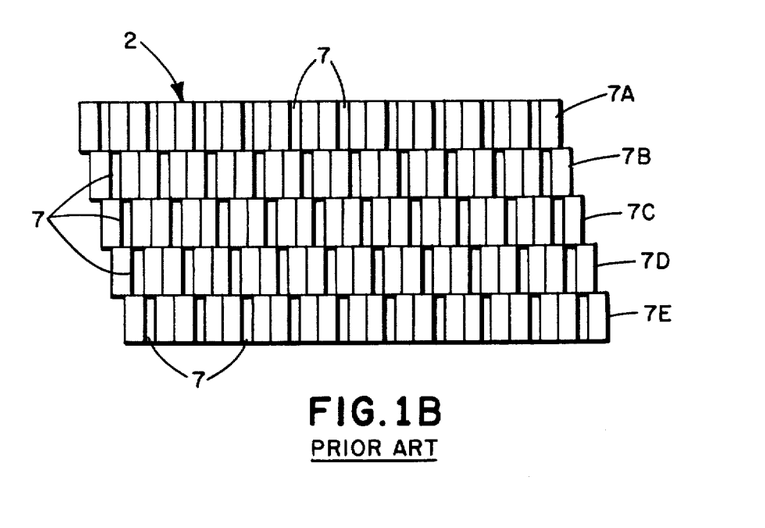
FIG. 1B shows a front view of a mask shown in FIG. 1A.

Solid light sensors, which developed quickly after charge coupled devices became available, have recently been used as multi-element devices for obtaining high resolution images. Since it is difficult to make multi-element devices of solid light sensors, a recent experiment was made to obtain a one dimensional image having high resolution by using a two dimensional sensor. The experiment is described in an article entitled "High Resolution Image Line Scanning With an Area Image Sensor" by Robert A. Sprague and William D. Turner, 1978 *Proceedings of the International Conference on the Application of Charged Coupled Devices*, pp 1–13 to 1–23, Oct. 25–27, 1978, held in San Diego, Calif. An illustration of this experiment is shown in FIGS. 1A and 1B. An image light generated from an image source 1 such as an illuminated document is focused onto a mask 2 and a two dimensional sensor 3 through lenses 4, 5 and 6. The two dimensional sensor 3 converts the image light into electrical image signals. As shown in FIG. 1B, mask 2 has many rectangular apertures 7 in a two-dimensional array. Apertures in adjacent rows, for example, rows 7A and 7B, are staggered at a predetermined resolution. Each aperture corresponds to a photoelectric converting element of sensor 3.

If image source 1 is moved in the direction of arrow 8 in FIG. 1A, the image light generated from line L of image source 1 irradiates aperature rows 7A, 7B, 7C . . . 7E in order. Then the movement of moving image source 1 is synchronized with the reading out of the electrical signals from the rows of photoelectric converting elements corresponding to aperture rows 7A, 7B . . . 7E. In other words, the image source 1 is moved in a predetermined timed order corresponding to the reading out of electrical signals from the photoelectric converting elements. The electrical signals are in a memory to form one dimensional image signals having high resolution.

The above method requires precision and an expensive mechanism because it is necessary to synchronize the movement of image source 1 at a precision higher than the desired resolution. Also, although this method uses a two dimensional sensor 3, the sensor produces only a one dimensional image.

Another method for obtaining high resolution image signals is described in Japanese Pat. No. 53-101939. In this method, an image is obtained by vibrating a two dimensional image sensor array relative to an image source in at least two directions of the plane containing the array. In this patent disclosure, the image sensor array is vibrated by an electro magnet. Also, the mirrors or lenses of the optical system can be vibrated by the electro magnet. A disadvantage of this method is that it is difficult to control the relative position between the sensor array and the image source due to the vibration. Thus, it is difficult to obtain high resolution image signals.

SUMMARY OF THE INVENTION

It is one object of the present invention to provide an image input device which obtains high resolution image signals and uses a two dimensional sensor.

According to this invention, the foregoing and other objects are attained by providing an image input device including a light sensor facing an image source which generates image light. This image light is divided into a plurality of picture elements. The light sensor is formed by a number of photoelectric converting elements which generate electrical signals. The number of photoelectric converting elements is smaller than the number of picture elements of image light. An image dividing or light splitting device is placed between the light sensor and the image source to divide the image light into the plurality of components to irradiate the light sensor in a predetermined timed order. The electrical signals generated by the photoelectric converting elements of the light sensor are read out in the same predetermined timed order and stored in a memory.

BRIEF DESCRIPTION OF THE DRAWINGS

Other objects and features of the invention will become apparent to those skilled in the art from the following description of a preferred embodiment of the invention, as illustrated in the accompanying drawings, in which.

DESCRIPTION OF THE PREFERRED EMBODIMENT

Figure 2:
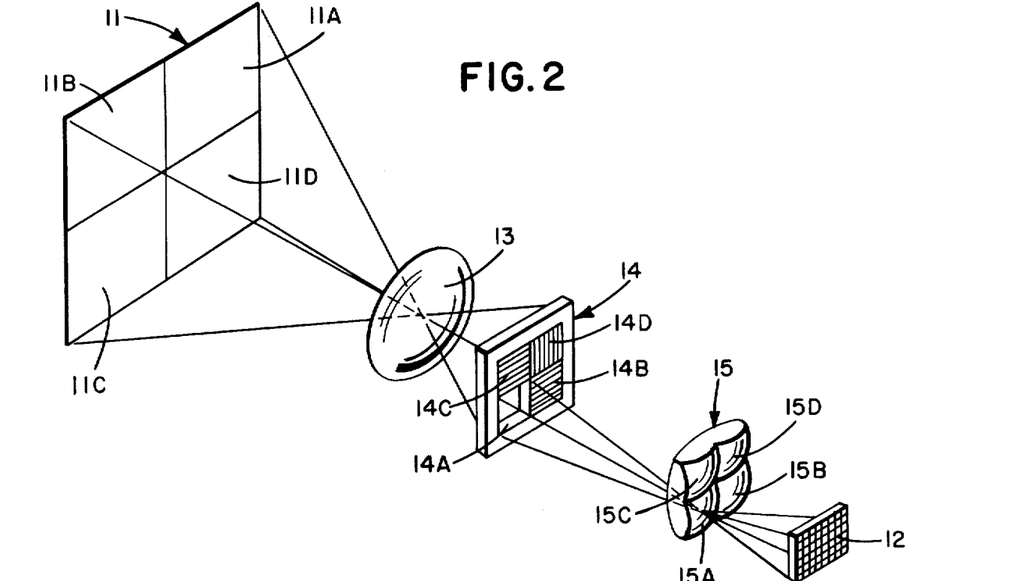
FIG. 2 shows a perspective view of one embodiment of the invention.
Figure 3:
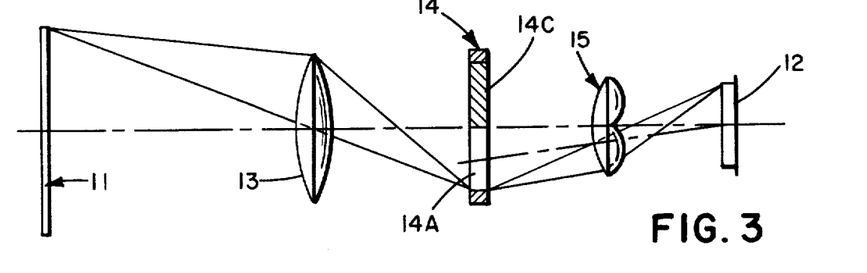
FIG. 3 shows an optical diagram of the embodiment shown in FIG. 2.
Figure 4:
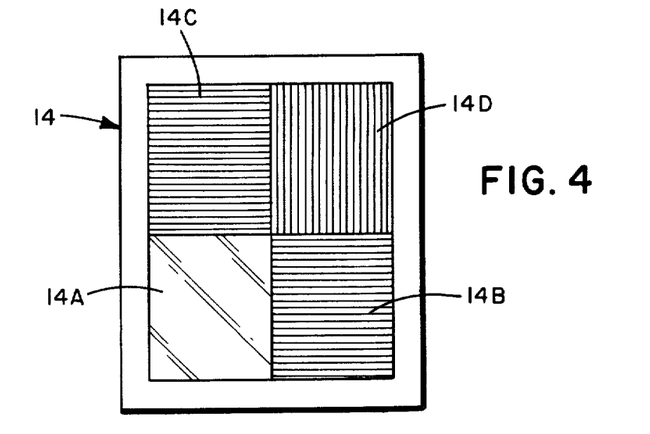
FIG. 4 shows a plan view of a shutter used in the embodiment shown in FIG. 2.

One embodiment of this invention is shown in FIGS. 2 and 3. An image source 11 may be, for example, a document illuminated by light. The image light generated by image source 11 is divided into a plurality of components as further described below. A light sensor 12, which faces image source 11, contains a number of photoelectric converting elements. The number of elements is larger than the number of picture elements which constitute the image light. A focusing lens 13, a shutter 14, and a compound eye lens 15 are placed between image source 11 and light sensor 12. The image light generated by image source 11 is focused by focusing lens 13. The focused image light then is divided by shutter 14 into four components by four windows 14A, 14B, 14C and 14D as shown in FIG. 4. The shutter is a liquid crystal device which can be made of PLZT or KDP crystal. The four windows can be opened (transparent) or shut (opaque) by applying voltage between the electrodes (not shown) of the liquid crystal device. The four windows are opened in turn in a predetermined timed order so that a component of image light passes through one opened window at a time. Thus, four components of image light are generated in FIG. 2 corresponding to parts 11A, 11B, 11C and 11D of image source 11. For example, the component of image light generated from part 11A of image source 11 passes through shutter 14 only when window 14A is opened.

Compound eye lens 15 consists of four small lenses 15A, 15B, 15C and 15D corresponding to the four windows 14A, 14B, 14C and 14D of shutter 14. The compound eye lens can be made of plastic. The component image light passing through window 14A of shutter 14 is focused on light sensor 12 by small lens 15A of compound eye lens 15. When the four windows 14A, 14B, 14C and 14D of shutter 14 are opened in turn in a predetermined timed order, four components of image light generated by image sources 11A, 11B, 11C and 11D are focused on light sensor 12 through small lenses 15A, 15B, 15C and 15D in turn. Therefore, light sensor 12 can generate four partial image signals corresponding to the four partial image sources 11A, 11B, 11C and 11D in a predetermined timed order. The four partial image signals are composed into one image signal in a two dimensional memory (not shown).

In this embodiment, at all times, light sensor 12 receives a partial image which is one-fourth the size of the whole image of image source 11. Thus, this embodiment has four times the resolution of an apparatus which does not have shutter 14 and compound eye lens 15. Generally, when image light is divided into n partial image light signals by a shutter, the resultant image signals have n times the resolution. As a result, by using the method of this embodiment, a light sensor equivalent to a high density light sensor can be obtained by using a low density light sensor.

Figure 5:
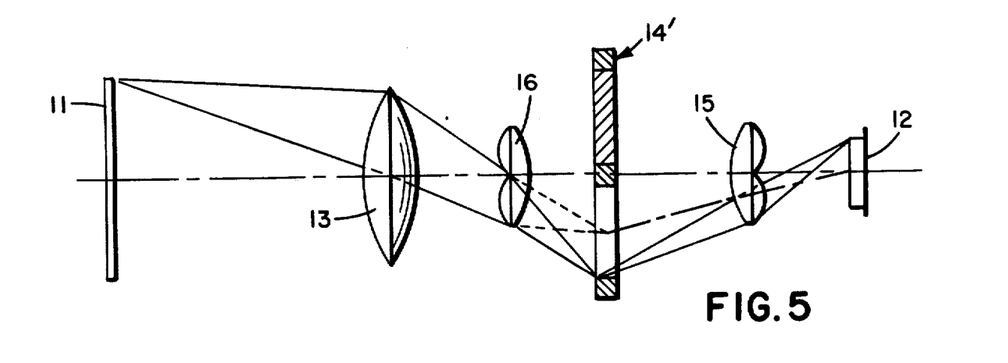
FIG. 5 shows an optical diagram of a second embodiment of the invention.
Figure 6:
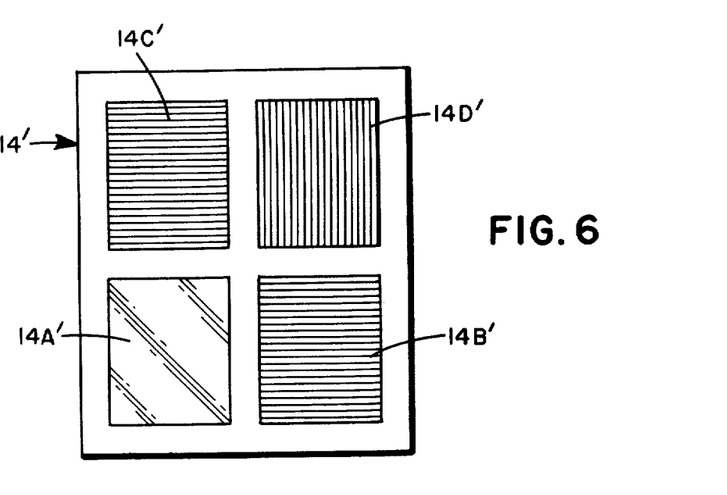
FIG. 6 shows a plan view of a shutter used in the embodiment shown in FIG. 5.

Another embodiment of the invention is shown in FIG. 5. The difference between this embodiment and the embodiment of FIG. 2 is that a compound eye lens 16 is placed between focusing lens 13 and shutter 14 as shown in FIG. 5. Compound eye lens 16 separates the components of image light. The lens 16 is similar to compound eye lens 15 in that it consists of four small lenses. In this second embodiment, a shutter 14' as shown in FIG. 6 is used. Shutter 14' has four windows, 14A', 14B', 14C' and 14D'. The shutter 14' is easier to make and provides better image signals than the shutter 14 of the embodiment shown in FIG. 2 because it is difficult to make a shutter having windows which closely contact one another. The shutter 14' has a light blocking area between windows and, accordingly, adjacent electrodes should be spaced.

Figure 7:
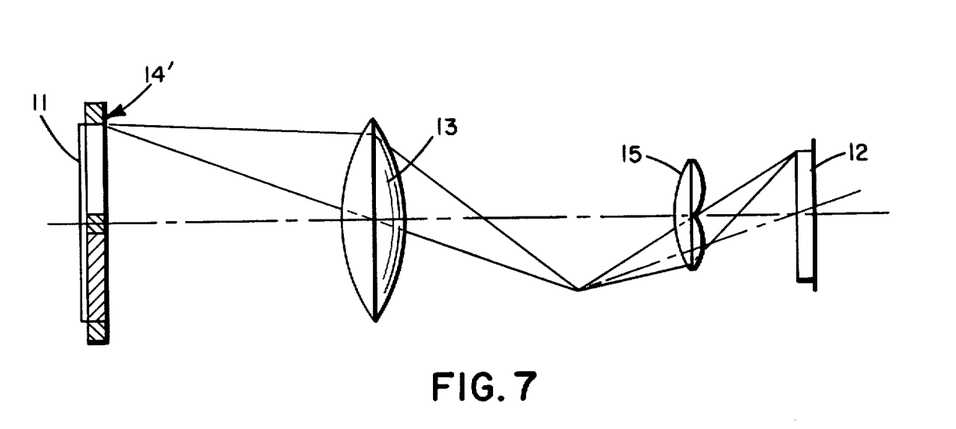
FIG. 7 shows an optical diagram of a third embodiment of the invention.

A third embodiment of the invention is shown in FIG. 7. In this embodiment, shutter 14' shown in FIG. 6 is placed adjacent image source 11. The other elements, such as focusing lens 13, compound eye lens 15, and light sensor 12, are placed in positions similar to the embodiment shown in FIGS. 2 and 3. The image light generated from image source 11 is divided into components by shutter 14'. Therefore, only one component of image light is focused by focusing lens 13 when three windows of shutter 14' are closed or shut. Then, the component of image light is focused on light sensor 12 which generates one partial image signal. The four partial image signals are composed into one image signal in a two dimensional memory such as a frame memory. An advantage of the embodiment shown in FIG. 7 is that the light blocking area between windows causes very little damage to the quality of the image. Also, the compound eye lens 16 of FIG. 5 is unnecessary in the embodiment of FIG. 7.

In all the above embodiments, the image light is divided into a plurality of components or partial image lights by a shutter. However, image light can also be divided into components by a mirror which deflects light. An example of a deflecting mirror arrangement is shown in FIG. 8.

Figure 8:
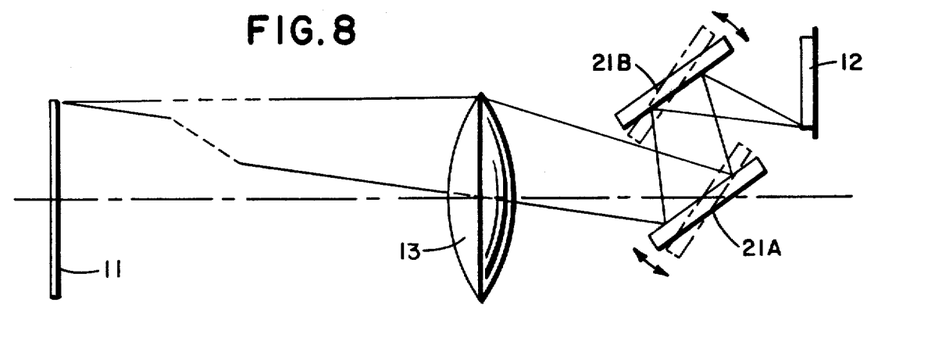
FIG. 8 shows an optical diagram of a fourth embodiment of the invention.

In FIG. 8, image light generated from image source 11 is focused by focusing lens 13. The light passing through focusing lens 13 is reflected by mirrors 21A and 21B. Mirror 21A deflects the light which passes through lens 13 in a vertical direction and mirror 21B deflects the light reflected by mirror 21A in a horizontal direction. By positioning the mirrors in four successive positions, light sensor 12 detects four components of image light generated from image source 11. In other words, the image light generated from image source 11 is divided into components or partial image light by mirrors 21A and 21B. The embodiment shown in FIG. 8 has the advantage of eliminating a shutter and a compound eye lens.

The image light generated from an image source is divided into several components or partial image light in all the above embodiments. However, using another technique, it is possible to divide image light into several components or partial image lights by varying the deflection of the image light through an arrangement of apertures. This latter technique will now be explained with reference to FIGS. 9-11.

Figure 9:
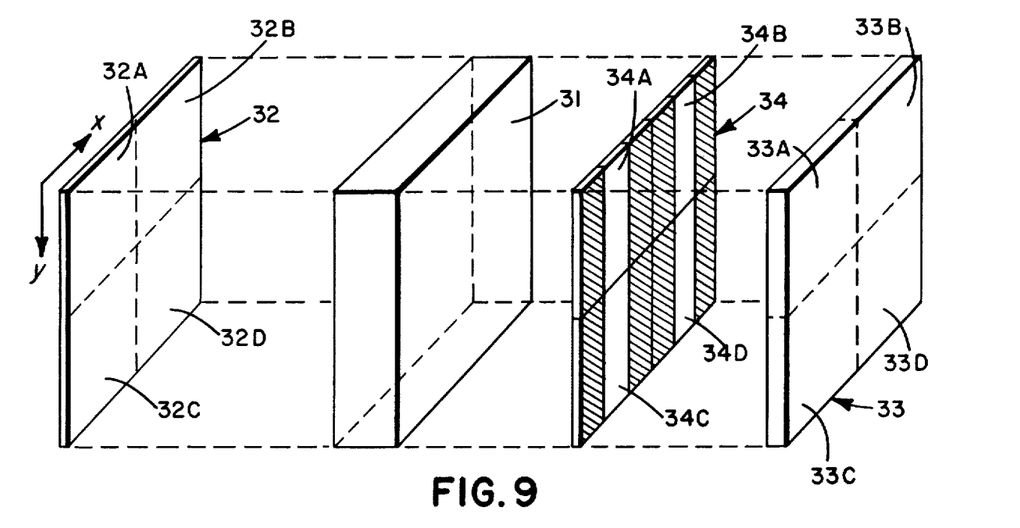
FIG. 9 shows a perspective view of a fifth embodiment of the invention.

As shown in FIG. 9, a light deflector 31 faces an image source 32 and a light sensor 33 faces light deflector 31. A mask 34 having several apertures is placed between light deflector 31 and light sensor 33. Image source 32 may be a document illuminated by light which generates an image light. Light deflector 31 is a light transmission type deflector which deflects the entire image light. The refraction index of light deflector is changed by varying the electric voltage applied to the light deflector. Mask 34 has four rectangular apertures 34A, 34B, 34C and 34D which correspond to four partial image sources 32A, 32B, 32C and 32D of image source 32. The rectangular apertures 34A and 34B are aligned with rectangular apertures 34C and 34D, respectively. Light sensor 33 is a two dimensional sensor which consists of four photoelectric converting elements 33A, 33B, 33C and 33D corresponding to the four components of image light or the four partial image sources 32A, 32B, 33C and 33D. The width of each aperture is one-third the width of each partial image source.

Figures 10A, 10B, 10C:
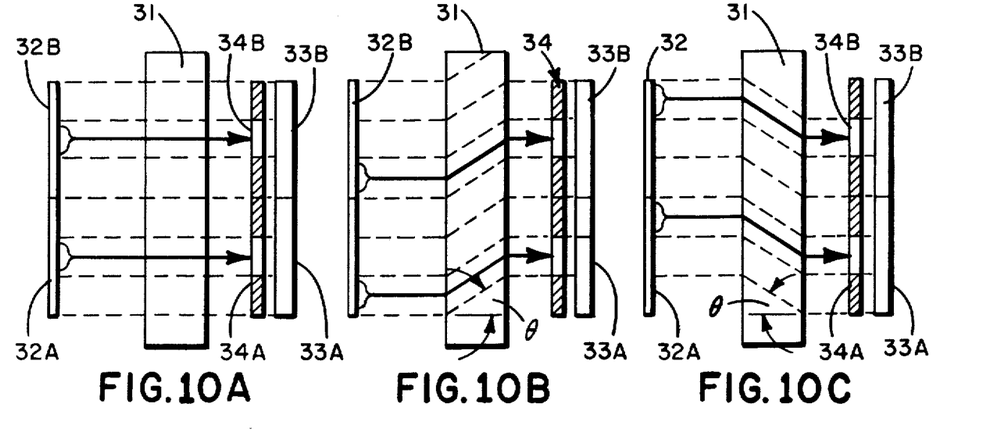
FIGS. 10A, 10B, 10C show optical paths in FIG. 9.
Figure 11A:
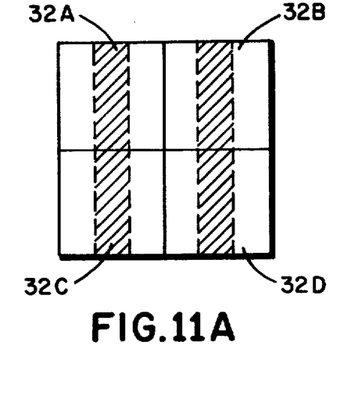
FIGS. 11A, 11B, 11C show light sources in FIG. 9.
Figure 11B:
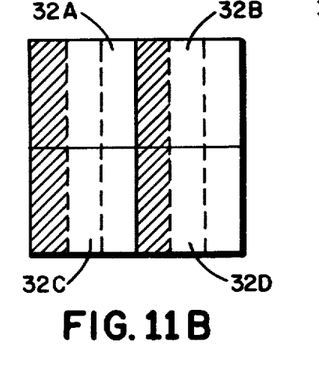
Figure 11C:
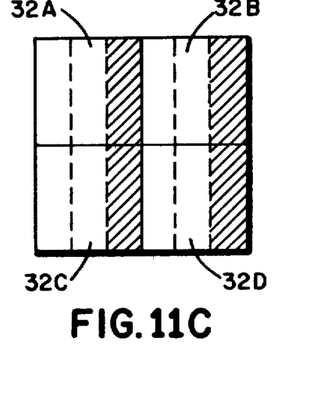

When light deflector 31 does not deflect the image light from image source 32, as shown in FIGS. 10A and 11A, only center light from each partial image source 32A, 32B, 32C and 32D passes through mask 34 and is detected by the four photoelectric converting elements 33A, 33B, 33C and 33D as shown in FIGS. 10A and 11A. When light deflector 31 deflects the image light at right hand angles, only light from the bottom portion of each partial image source passes through mask 34 and is detected by photoelectric converting elements as shown in FIGS. 10B and 11B. On the other hand, when light deflector 31 deflects the image light at left hand angles, only light from the top portion of each partial image source passes through mask 34 and is detected by the photoelectric converting elements 33A, 33B, 33C and 33D as shown in FIGS. 10C and 11C. Thus, light sensor 33, which consists of four photoelectric converting elements corresponding to the four components of image light from image sources 32A-32D, is capable of detecting three components of image light. These three components are composed in a two dimensional memory to form one image which consists of an arrangement of 6×2 elements. In the above embodiment, the image light is divided in only the x axis direction; however, the image light can be further divided in a y axis direction by changing mask 34 and light deflector 31.

A preferred embodiment of this latter embodiment will now be explained with reference to FIGS. 12-16. A document 41 is placed on a document stand 42. Document stand 42 is made of transparent material such as a glass plate. The whole face of document 41 is illuminated by light sources 43A and 43B through document stand 42. Preferably, the light source irradiates single frequency light and the light should be irradiated uniformly on the document. A light sensor 44 is a two dimensional array of M×N elements (cells). Light sensor 44 is placed so that the image light of document 41 may be focused on light sensor 44 by a focusing lens 45. The light passes through focusing lens to light sensor 44 through a light deflector 46 and a mask 47. A driving circuit 48 reads out the image signals from light sensor 44; a deflection control circuit 49 controls the deflecting angle of light deflector 46; and signal processing circuit 50 processes the image signals from light sensor 44.

Figure 13:
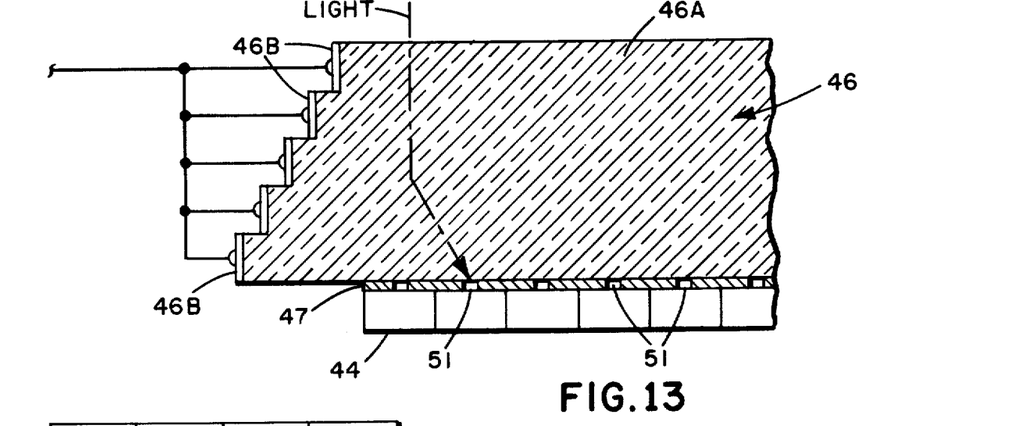
FIG. 13 shows a cross view of the light deflector 46 used in the embodiment shown in FIG. 12.

A cross sectional view of the light sensor 44, light deflector 46 and mask 47 is shown in FIG. 13. A charge coupled device (CCD) sensor is used as light sensor 44 and mask 47 is formed by evaporating an Al layer on the surface of the CCD sensor. Each aperture 51 of mask 47 corresponds to each cell of the sensor 44. By forming the mask in the above manner, the image light only irradiates part of the CCD sensor. Furthermore, it is possible to form sense amplifiers to amplify the signals of each cell and a transferring circuit to transfer the received signal from the sensor in a predetermined timed order. An acoustic-optical element is used as light deflector 46. Namely, material 46A, which passes ultrasonic waves and light, is placed on mask 47 and acoustic vibrators 46B are placed at one end of material 46A a shown in FIG. 13. When acoustic signals which satisfy Bragg's reflecting equation are supplied on acoustic vibrators 46B, the irradiated light is deflected in accordance with a vector wave formed by the acoustic signals. When the frequency of the acoustic signals is changed, the vector wave changes which changes the deflection angle of light.

Figure 14:
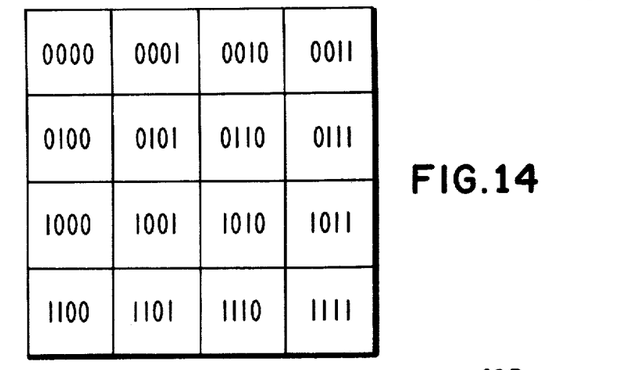
FIG. 14 shows the cells of light sensor 44 in FIG. 12.
Figure 15:
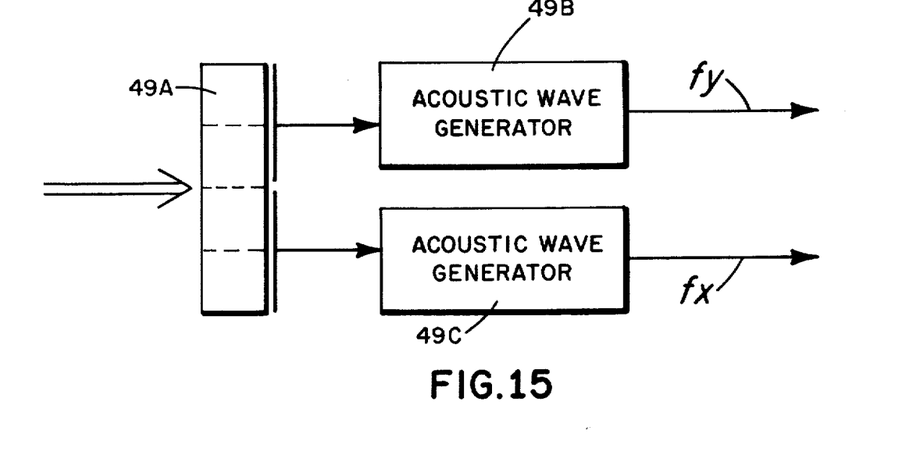
FIG. 15 shows a block diagram of a deflection control circuit 49 used in FIG. 12.

FIG. 14 shows the size of the cells of light sensor 44 and the relative position between one cell and the aperture 51 corresponding to the cell. Since the size of the aperture 51 is 1/16 the size of one cell, the cell is divided into 16 areas and each area has an address shown in FIG. 14. Deflection control circuit 49 comprises a 4-bit register 49A and two acoustic wave generators 49B and 49C as shown in FIG. 15. An address signal shown in FIG. 14 is supplied to register 49A. The upper two bits of the address signal are supplied to acoustic wave generator 49B and the lower two bits of the address signal are supplied to acoustic wave generator 49C. Acoustic wave generator 49B generates an acoustic wave of frequency fy to deflect the irradiated light in a direction along the y axis according to the upper two bits of the address signal. Acoustic wave generator 49C generates an acoustic wave of frequency of fx to deflect the irradiated light in a direction along the x axis according to the lower two bits of the address signal. All the area of one cell shown in FIG. 14 is irradiated by the image light in accordance with the address signal supplied by register 49A. Thus, 16 partial images can be detected by supplying address signals into register 49A of the deflection control circuit 49.

Figures 16, 17, 18:
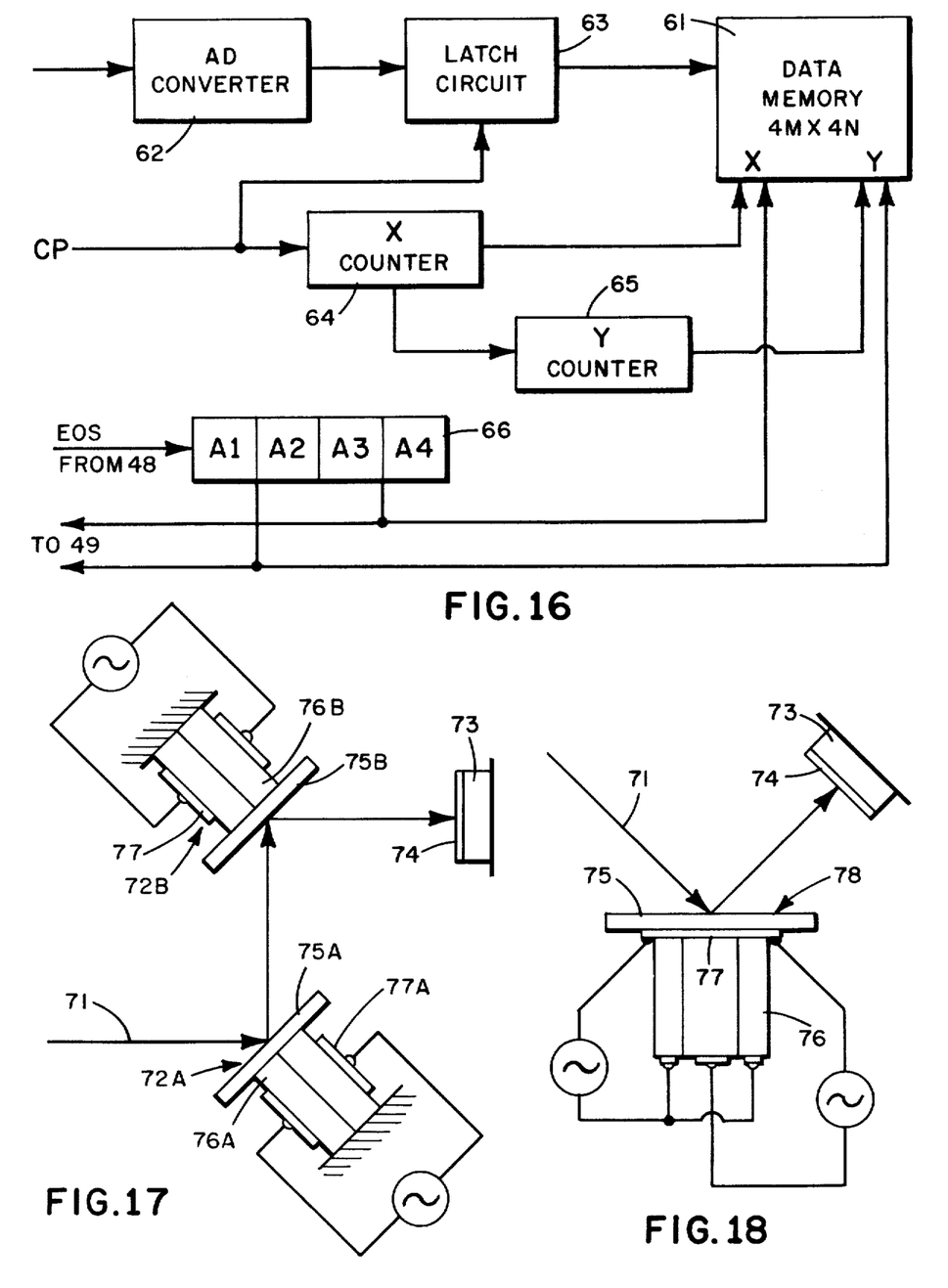
FIG. 16 shows a block diagram of a signal processing circuit 50 used in FIG. 12.
FIG. 17 shows a schematic view of another embodiment of the invention.
FIG. 18 shows a schematic view of a further embodiment of the invention.

Signal processing circuit 50 is shown in FIG. 16 in detail. This circuit comprises a data memory 61 which stores 4M×4N data, an AD converter 62 to convert analog image signals from light sensor 44 into digital image signals a latch circuit 63 to latch the digital image signals, and three counters 64, 65, and 66. Light sensor 44 is self scanning and scans each cell in a predetermined timed order in accordance with scan clock CP supplied by driving circuit 48; light sensor 44 then outputs detected image signals. When one scan is finished, light sensor 44 outputs M×N electrical image signals and driving circuit 48 outputs a scan end signal EOS.

The electrical image signals from light sensor 44 are supplied to AD converter 62 and converted into digital image signals. The digital image signals are supplied to latch circuit 63 which is synchronized by the scan clock CP. The output of latch circuit 63 is connected to data memory 61. The clock signals of scan clock CP are counted by X counter 64. The X counter 64 outputs a carry signal when the counter counts M clock signals of scan clock CP. The carry signals are counted by Y counter 65. The scan end signals EOS are counted by 4-bit counter 66. The numbers counted by counter 66 are supplied to register 49A of deflection control circuit 49 as address signals.

The X address of data memory is designated by the count number of X counter 64 and the lower two bits (A3 and A4) of the counter 66. The Y address is designated by the count number of Y counter 65 and the upper two bits (A1 and A2) of the counter 66.

At first, all counters are cleared. With the counter 66 set to "0000", deflection control circuit 49 controls the deflection of light through light deflector 46 to the "0000" area shown in FIG. 14. When driving circuit 48 begins to generate scan clock signals CP, analog image signals from light sensor 44 are supplied to AD converter 62 and converted to digital image signals. The digital image signals are supplied into latch circuit 63.

Since the XY address in data memory 61 is designated by the numbers stored in X counter 64, Y counter 65 and 4 bit counter 66, the digital image signals from latch circuit 63 are stored in the designated address of data memory 61. As one scan of light sensor 44 is finished, then a scan end signal EOS is supplied into 4 bit counter 66 and the count number of counter 66 becomes "0001". Deflection control circuit 49 controls the deflection of light through light deflector 46 to the area corresponding to "0001" shown in FIG. 14. This operation is repeated 16 times so all image signals (4M×4N signals) are stored in data memory 61. Thus, a 4M×4N image is obtained by using an M×N light sensor.

Figure 12:
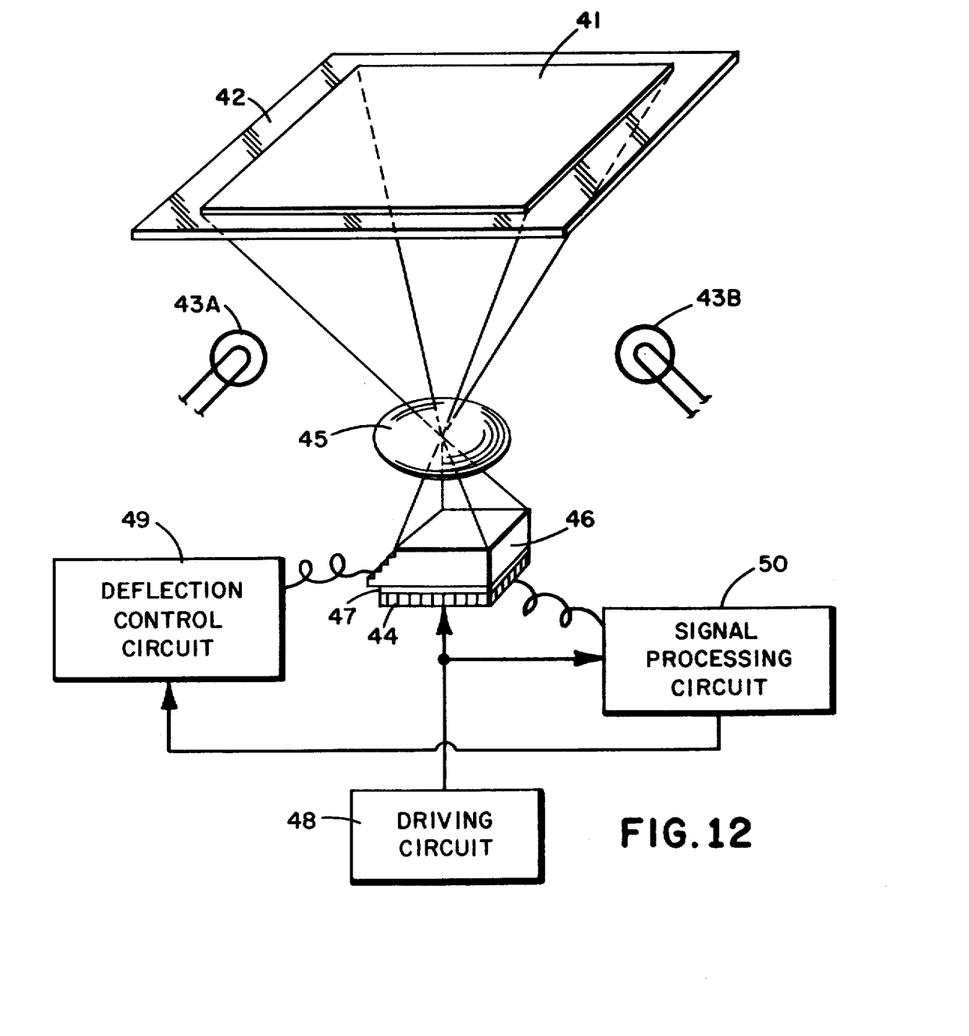
FIG. 12 shows a perspective view of another embodiment of the invention.

In the embodiment shown in FIG. 12, a light transmission type light deflector is used. However, one or more light deflectors of light reflection type can be used as shown in FIG. 17. Image light 71 from an image source is reflected by two light deflectors 72A and 72B to a light sensor 73 through a mask 74. Light deflectors 72A and 72B each includes a mirror (75A and 75B) and piezoelectric material (76A and 76B) positioned in a different polarization. Light deflectors 72A and 72B each deflect the irradiated light in accordance with voltages supplied to electrodes 77A and 77B mounted on piezoelectric materials 76A and 76B. Light deflector 72A deflects the image light in the X direction and light deflector 72B deflects the image light reflected from mirror 75A in the Y direction.

Another embodiment of the invention is shown in FIG. 18. In this embodiment, a light deflector 76 is shown which can deflect light in two dimensions. The same reference numbers are used in FIG. 18 as used in FIG. 17.

Figure 19:
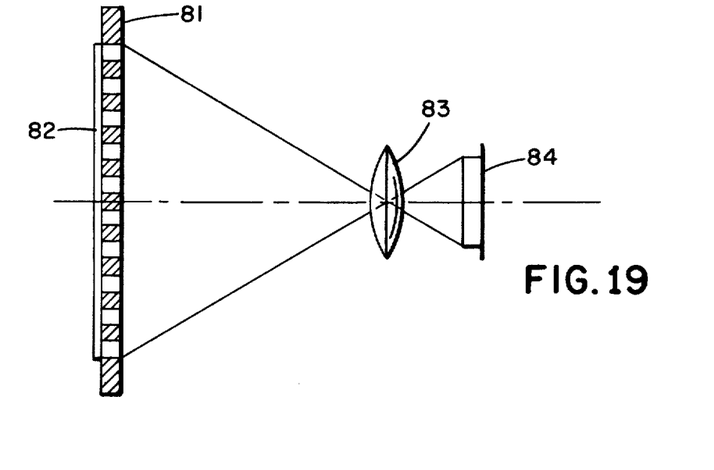
FIG. 19 shows an optical diagram of another embodiment of the invention.
Figure 20:
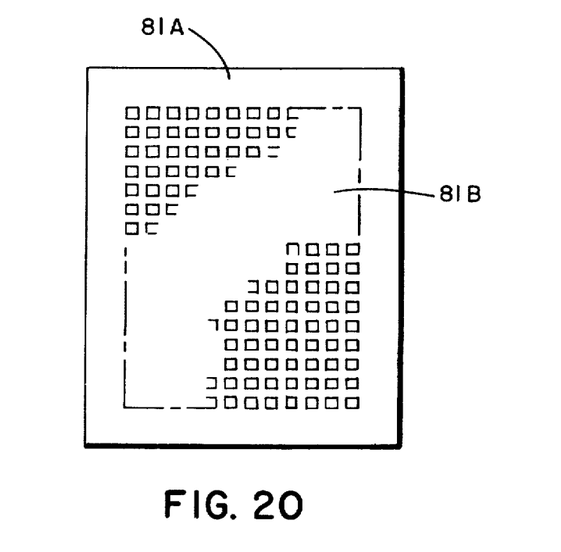
FIG. 20 shows a plan view of a shutter used in FIG. 19.
Figure 21:
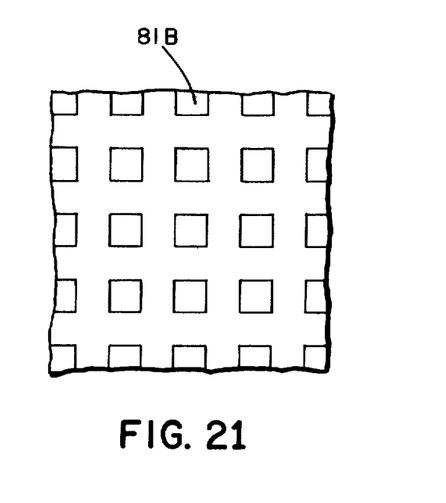
FIG. 21 shows an enlarged view of the shutter in FIG. 20.

Although light deflectors are used in the above embodiment, it is not necessary to use light deflectors in the present invention. As shown in FIG. 19, a shutter 81 is placed near a light source 82. Image light passing through shutter 81 is focused by a focusing lens 83. The focused image light is detected by a light sensor 84. Shutter 81 comprises a frame 81A and a window 81B as shown in FIG. 20. An enlarged view of window 31B is shown in FIG. 21. In FIG. 21, each area enclosed by bold lines, which defines a component of image light, corresponds to each cell of light sensor 84. Each area consists of four windows made of liquid crystal. One of the windows is opened and the other windows are closed. When the four windows are opened in turn, four partial images or subcomponents of image light are detected by light sensor 84. The four partial images are composed in a memory in the same manner as described above with reference to the other embodiments of the invention.

Although illustrative embodiments of the present invention have been described with reference to the accompanying drawings, various changes can be made in the invention by those of ordinary skill in the art without departing from the scope and spirit of this invention. For example, although two dimensional light sensors are used in the above embodiments, the invention is also applicable to one dimensional light sensors.

We claim:

1. An image input device comprising:
   an image source which generates an image light;
   a light sensor facing said image source, and said light sensor including a two-dimensional array of photoelectric converting elements for generating electrical signals in response to the image light;
   image dividing means positioned between said light sensor and said image source for dividing the image light into a plurality of components in a predetermined timed order, the plurality of components of image light individually irradiating all of said photoelectric converting elements of said light sensor in the predetermined time order; and
   reading means connected to said light sensor for reading out the electrical signals from said light sensor in the predetermined timed order.

2. An image input device according to claim 1, wherein said image dividing means comprises:
   shutter means for dividing the image light into a plurality of components and passing individual components of the image light to said light sensor;
   a focusing lens placed between said shutter means and said image source for focusing the image light on said shutter means; and
   a first compound eye lens composed of several small lenses placed between said shutter means and said light sensor for focusing the individual components of the image light on said light sensor.

3. An image input device according to claim 2, wherein said dividing means further comprises a second compound eye lens composed of several small lenses placed between said focusing lens and said shutter means for separating the image light into the plurality of components.

4. An image input device according to claim 2, wherein said shutter means is placed adjacent said image source.

5. An image input device according to claim 1, wherein said image dividing means comprises:
   a focusing lens for focusing the image light,
   at least one mirror for dividing the image light into the plurality of components in a predetermined timed order to irradiate said light sensor.

6. An image input device comprising:
   an image source which generates an image light;
   a light sensor facing said image source, said light sensor including a two-dimensional array of photoelectric converting elements for generating electrical signals in response to the image light;
   a mask placed between said light sensor and said image source and having a two-dimensional array of apertures, the number of apertures corresponding to the number of said photoelectric converting elements;
   light deflector means placed between said mask and said image source for selectively deflecting the image light through said apertures of said mask to said light sensor, said light deflector means varying the amount of deflection of the image light in a predetermined timed order to divide the image light passing through said apertures into a plurality of components; and
   reading means connected to said light sensor for reading out electrical signals from said light sensor in the predetermined timed order.

7. An image input device according to claim 6, wherein said light deflector means is made of an acousto-optical element.

8. An image input device according to claim 6, wherein said light deflector means comprises piezoelectric elements which are fixed to each other in different polarity and a mirror fixed to said piezo-electric elements.

* * * * *